US011567723B2

(12) United States Patent
Goldberg et al.

(10) Patent No.: US 11,567,723 B2
(45) Date of Patent: Jan. 31, 2023

(54) DISPLAY OF SUPPLEMENTAL CONTENT

(71) Applicant: DISNEY ENTERPRISES, INC., Burbank, CA (US)

(72) Inventors: Evan M. Goldberg, Burbank, CA (US); Daniel L. Baker, Los Angeles, CA (US); Steven M. Chapman, Newbury Park, CA (US); Dane M. Coffey, Burbank, CA (US); Matthew Deuel, Playa Vista, CA (US); Mark R. Mine, Santa Clarita, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/223,206

(22) Filed: Apr. 6, 2021

(65) Prior Publication Data
US 2021/0373834 A1 Dec. 2, 2021

Related U.S. Application Data

(60) Provisional application No. 63/029,884, filed on May 26, 2020.

(51) Int. Cl.
*G06F 3/14* (2006.01)
*G09G 1/00* (2006.01)
(Continued)

(52) U.S. Cl.
CPC ........... *G06F 3/1423* (2013.01); *G09G 1/007* (2013.01); *G09G 5/14* (2013.01); *H04N 21/4122* (2013.01);
(Continued)

(58) Field of Classification Search
CPC .... G06F 3/1423; G06F 1/1647; G06F 1/1649; G06F 1/165; G09G 1/007; G09G 5/14;
(Continued)

(56) References Cited

U.S. PATENT DOCUMENTS 8,792,054 B2 7/2014 Mountain
9,456,170 B1 9/2016 Miller et al.
(Continued)

FOREIGN PATENT DOCUMENTS

EP 3407612 A1 11/2018
JP 2015192280 A 11/2015
WO 0186350 A1 11/2001

OTHER PUBLICATIONS

Kushalnagar et al., "Captions Versus Transcripts for Online Video Content", https://www.cs.cmu.edu/~jbigham/pubs/pdfs/2013/captionvstranscripts.pdf, Rochester Institute of Technology; University of Rochester, 2013, 4 pages.
(Continued)

*Primary Examiner* — Brent D Castiaux
(74) *Attorney, Agent, or Firm* — Dorsey & Whitney LLP

(57) ABSTRACT

The present disclosure describes a method for displaying supplemental content. The method includes determining environmental characteristics, e.g., wall space, empty areas, colors, etc., for a display environment, determining supplemental content based in part on a primary content displayed by a primary display, and displaying the supplemental content in the display environment.

19 Claims, 8 Drawing Sheets

(51) Int. Cl.
  *G09G 5/14*   (2006.01)
  *H04N 21/41*  (2011.01)
  *G06F 1/16*   (2006.01)

(52) U.S. Cl.
  CPC ........ *A63F 2300/303* (2013.01); *G06F 1/165* (2013.01); *G06F 1/1647* (2013.01); *G06F 1/1649* (2013.01)

(58) Field of Classification Search
  CPC ........... G09G 2340/14; G09G 2356/00; G09G 2360/144; H04N 21/4122; A63F 2300/303
  See application file for complete search history.

(56) References Cited

U.S. PATENT DOCUMENTS

| | | |
|---|---|---|
| 10,003,764 B2 | 6/2018 | Chaudhri |
| 2014/0051510 A1* | 2/2014 | Benko .................... H04N 7/002 463/31 |
| 2016/0219338 A1* | 7/2016 | Wang ................. H04N 21/4782 |
| 2018/0103287 A1* | 4/2018 | Reichow .............. H04N 9/3141 |
| 2019/0075418 A1* | 3/2019 | Shi .......................... H04S 7/303 |

OTHER PUBLICATIONS

Office of Comm., "Television Access Services", https://www.ofcom.org.uk/_data/assets/pdf_file/0016/42442/access.pdf, Mar. 23, 2006, 74 pages.

U.S. Patent & Trademark Office, "U.S. Appl. No. 16/892,194", filed Jun. 3, 2020.

\* cited by examiner

DISPLAY OF SUPPLEMENTAL CONTENT

CROSS REFERENCE TO RELATED APPLICATIONS

This application claims priority under 35 U.S.C. § 119 to U.S. Provisional Application No. 63/029,884 entitled "Display of Supplemental Content," and filed on May 26, 2020, which is incorporated by reference herein for all purposes.

FIELD

Examples described herein generally relate to content viewing experiences and supplementing content as it is displayed.

BACKGROUND

People watch many different types of content in different viewing environments, such as within different rooms, locations, and the like. Content, which may include television shows, movies, sporting events, news, and the like, may include supplemental information, such as closed captioning, stock or score "tickers," and other information displayed with the primary content. Often, given size constraints of different display devices, such supplemental information may obscure the primary content, as well create a "busy" display, making it difficult for a user to view the primary content. Similarly, many users may not care about the supplemental information being displayed and do not enjoy the obscured and busy view.

SUMMARY

In one example, a method for displaying supplemental content is disclosed. The method includes determining environmental characteristics for a display environment, determining supplemental content based in part on a primary content displayed by a primary display, and displaying the supplemental content in the display environment.

In another example, a system for displaying supplemental content is disclosed, where the system may include a primary display configured to display primary content and a supplemental display configured to display supplemental content.

In yet another example, a system for displaying supplemental content is disclosed. The system may include a primary display configured to display primary content and a supplemental display configured to display supplemental content different from the primary content. The supplemental display is configured to determine a display location for the supplemental content based on an analysis of detected environmental characteristics of a display environment of the primary content, select the supplemental content based in part on the display location and the primary content, and display the supplemental content at the display location.

In another example, a non-tangible computer readable medium storing instructions to be read by a computer is disclosed. The instructions when read by the computer cause the computer to: determine a display location for supplemental content to be displayed by a supplemental display based on an analysis of detected environmental characteristics of a display environment for primary content displayed by a primary display, select the supplemental content based in part on the display location and the primary content, and display the supplemental content at the display location.

In addition to the exemplary aspects and embodiments described above, further aspects and embodiments will become apparent by reference to the drawings and by study of the following description.

SPECIFICATION

The present disclosure includes systems and methods for enhancing displayed content by displaying supplemental content for primary content, where the supplemental content is displayed on a separate display location than the primary content. In many instances, environmental information may be used to identify a display location for the supplemental content. For example, empty wall space (e.g., blank areas of the wall) adjacent to or within the same room as a primary display may be used as a supplemental display location to display the supplemental content. In this example, the supplemental content may correspond to the primary content displayed on the primary display, but be displayed outside of the primary display location, so as to not obscure or impact the view of the primary content.

In some instances, the supplemental content may be selected to add to or enhance the primary content. For example, in some instances, the supplemental content may be generated to include trivia or facts about the content (e.g., actor information, series information), plot information, bonus content features generated by the primary content creators, or the like. In these examples, the supplemental content may not just be a repackaging or reformatting of the primary content (e.g., different from close captioning which may just be a written recitation of the primary content), but enhance and extend the primary content experience. In other instances, the supplemental content may be separate or unrelated to the primary content, such as include news alerts, emergency notifications, sports scores, or the like, and due to the display being offset or separate from the primary display allow a user to view the supplemental content without interfering with the user's view of the primary display.

In various embodiments, the display location for the supplemental content may be determined by analyzing characteristics of a display environment 104. Additionally or alternatively, the display location can be determined based on user input, such as via a user device (e.g., remote, smart phone, etc.) or via user actions (e.g., gestures, gaze, or voice). Similarly, the system may allow a user to interact with or control the supplemental content via user input, either via a user device or user actions. For example, the supplemental content may include a graphical element or icon, where the user can utilize a laser pointer or light output by a user device or a hand in the direction of the graphical element that can be used by the system to select the graphical element.

Figure 1:
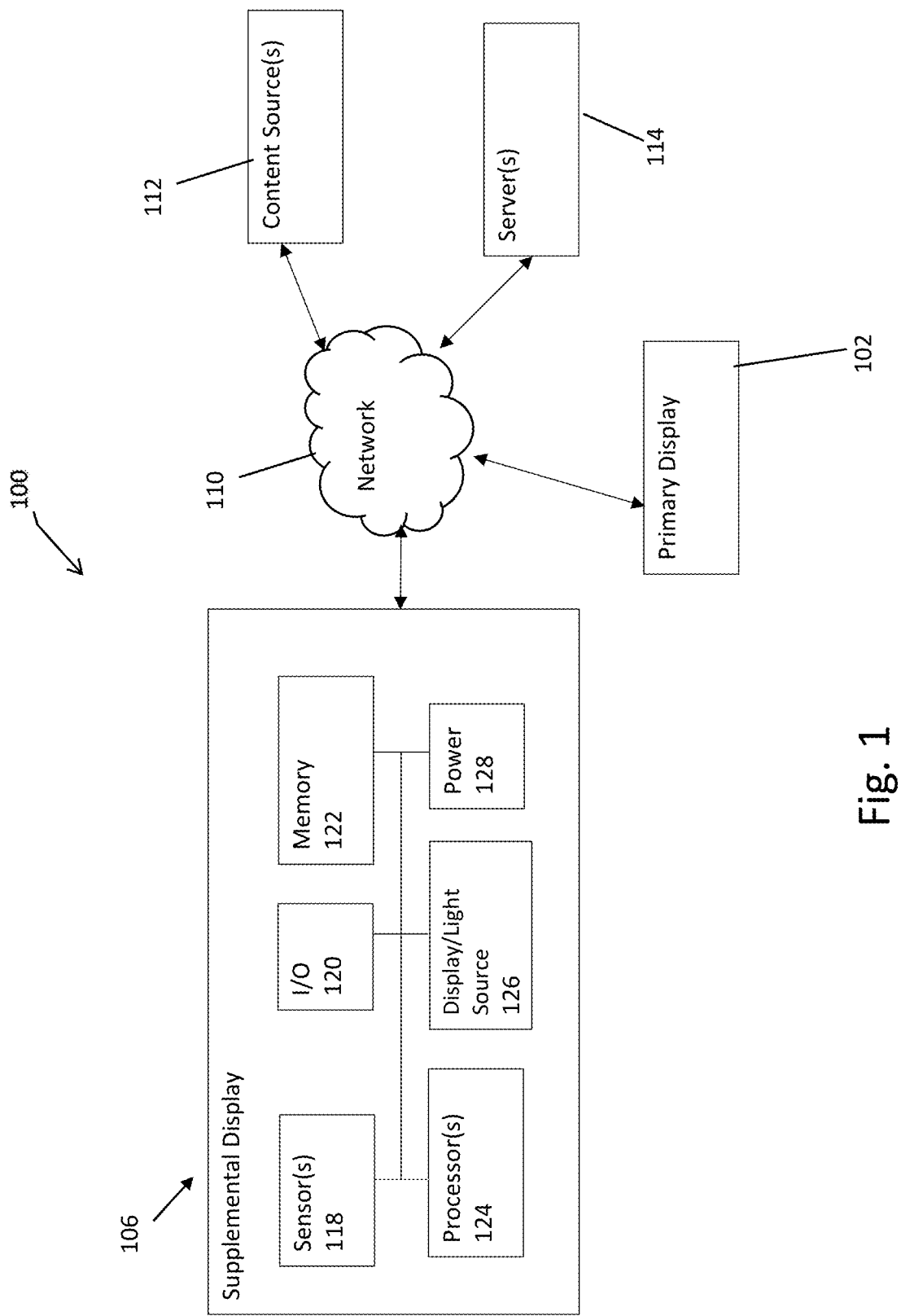
FIG. 1 is a block diagram of a system for displaying supplemental content.
Figure 2:
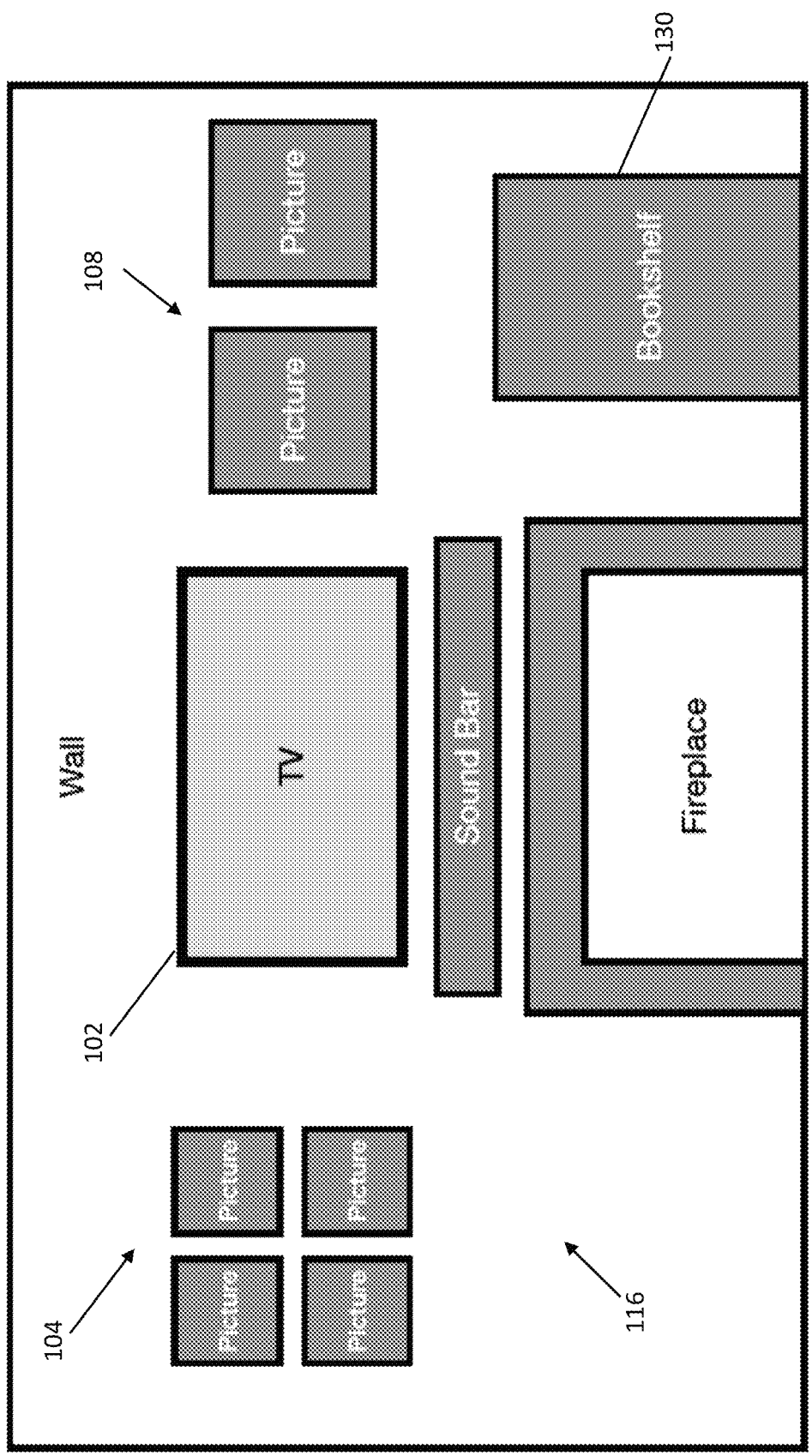
FIG. 2 is a schematic of an example display environment.

FIG. 1 illustrates a block diagram of a display system 100. FIG. 2 illustrates a simplified view of the display system within a display environment 104. With reference to FIGS. 1 and 2, the system 100 may include a primary display 102 and a supplemental display 106, both of which may be in communication with each other and/or with one or more content sources 112, servers 114, databases, or the like, such as via a network 110 or other communication mechanism.

The primary display 102 displays primary content, which may be content received or transmitted to the primary display 102 (e.g., via the Internet, cable connection, set top box connection, Bluetooth connection, etc.), read from a location (e.g., storage device coupled to the primary display 102), or may be stored on the primary display 102 itself (e.g., in memory). The primary display 102 may generally be any type of device configured to receive content and generate visual images, such as but not limited to, televisions, computer displays/monitors, projectors, light emitting diode displays, plasma displays, or the like. The primary content is content to be displayed on the primary display 102 and supplemented or enhanced by other components of the system 100.

The supplemental display 106 displays supplemental content, which may be received or transmitted to the supplemental display 106 and/or may be stored on the supplemental display 106 in manners similar to the primary content. The supplemental display 106 may be any type of device configured to receive content and generate images, such as but not limited to, televisions, computer displays/monitors, light emitting diode displays, plasma displays, and/or projectors. To that end, it should be noted that although the term "display" is used, the primary display 102 and supplemental display 106 may be any type of device that can generate or emit light, even if the light is formed or actually "displayed" on another surface (e.g., a projector that projects light onto a wall or screen). Additionally, it should be noted that in some instances, the primary display 102 and the supplemental display 106 may be a single device or otherwise integrated so as to be capable of displaying both the primary and supplemental content. For example, a projector may display primary content in a first area of the display environment 104 and also display the supplemental content in a second area of the display environment 104. In other examples, the supplemental display 106 and/or the primary display 102 may be used to extend or vary an alternative reality or virtual reality display. For example, an alternative reality or virtual reality headset may include an integrated display that displays primary content and/or a first portion of the supplemental content, while other content, such as a second portion of the supplemental content may be displayed directly on the surfaces of the display environment 104, such as content displayed by the supplemental display 106 on a wall 116 in the display environment 104.

The supplemental display 106 may include one or more sensors 118 that may be used to detect environmental characteristics, user input, and the like. For example, the sensors 118 may be configured to detect light, sounds, colors, surfaces, objects, and the like, which may be used to allow the supplemental display 106 to have awareness about a display environment, such as where obstacles, empty wall space, room characteristics (e.g., size color, geometry), and the like are positioned, arranged, and otherwise defined. As a specific example, the supplemental display 106 may use sensors 118 to determine locations of furniture, artwork, posters, photographs, or other elements mounted to a wall 116; locations of walls; sizes and/or locations of windows; color and/or lighting with the room and wall 112 surfaces; user locations within the display environment; user movement within the display environment; and the like.

The sensors 118 may include, for example, ambient light sensors, colored light sensors, infrared light sensors, depth sensors, cameras, microphones, and the like. In some embodiments, the supplemental display 106 may use depth and other sensing techniques, such as structured light analysis, where structured light patterns are displayed by the supplemental display 106 on various surfaces and the reflected light is captured by sensors 118 on the supplemental display 106 and evaluated to determine variations between the displayed light to the captured light, which can then be used to determine the environmental characteristics. It should be noted that in some embodiments, the sensors 118 may be separate from the supplemental display 106, e.g., standalone devices (internet connected devices, home assistants, etc.), integrated into other components of the system 100 (e.g., primary display), or the like.

In some embodiments, the sensors 118 may also be used to detect user inputs, such as user gaze, user gestures, audible outputs, or the like. These user inputs or user characteristics can then be used to control the supplemental content, provide inputs to the system 100, or the like. Alternatively or additionally, the system 100 may also include a user device, such as a remote, smartphone, or the like. It should be noted that the sensors 118 may be integrated with the supplemental display 106, but also may be included as separate sensors 118 within the display environment 104, e.g., standalone sensors or sensors integrated into the primary display 102 that are in communication with the supplemental display 106.

The supplemental display 106 may also include an input/output interface 120. The input/output interface 120 may be used to receive and/or transmit data between the supplemental display 106 and other computing devices and/or users. For example, the input/output interface 120 may be coupled to the network 110 to allow the supplemental display 106 to receive data, such as supplemental content, from the one or more content sources 112 and/or servers 114 or other databases. The input/output interface 120 may also receive user input, such as commands or instructions received form a user (e.g., via a remote controller or console, keypad, keyboard, mouse, microphone, touch screen display, or the like).

The supplemental display 106 may include or be in communication with one or more memory 122 components. The memory 122 may be any type of component configured to store data, such as, but not limited to read only memory, random access memory, solid state drive, or secure digital cards. As can be appreciated, while a single box is depicted as the memory 122, any number of memory components may be used. The memory 122 may be in communication, directly or indirectly, with a processor 124. The memory 122 may store executable instructions for execution by the processor 124, such as executable instructions for generating and/or displaying supplemental content.

The processor 124 may be any type of component configured to execute instructions and/or receive data. The processor 124 may encompass any number or type of processing elements, such as, but not limited to, central processing units, graphics processing units, mobile processors, digital signal processors, microprocessors, micro controllers, computer chips, and/or processing units configured to execute machine language instructions and software and process data such as executable instructions for generating supplemental content.

A light source 126 or display elements are used to emit or otherwise generate light that can be used to form images that may form supplemental content. The light source 126 will vary depending on the type of device of the supplemental display 106, but may include, for example, one or more light emitting diodes, a light emitting diode engine, organic light emitting diodes, light engines, and so on. In some instances, the light source 126 is configured to display light onto an exterior surface, such as a screen, wall, or other surface or surfaces that are exterior to the supplemental display 106. In other instances, the light source 126 may be configured to emit light within or as part of the supplemental display 106.

A power source 128 provides power to the various components of the supplemental display 106 and may include one or more elements, such as a power converter, and be configured to receive power from various sources (e.g., wall outlet, batteries, and the like).

It should be noted that one or more of the components of the supplemental display 106 may also be included within the primary display 102. For example, the primary display 102 may include sensors, processing elements, and the like.

With continued reference to FIG. 1, the content sources 112 may include various types of content providers, such as, but not limited to, content creators, cable providers, content distribution network servers, movie studios, and the like. The content sources 112 may include multiple different types of sources, such as broadcast stations, as well streaming content, and the like, that may provide primary content to be displayed. Similarly, the servers 114 or content database may include additional types of content sources that may include various content information and may also include supplemental content or information that can be used to generate supplemental content, e.g., internet databases, website, content databases, and the like.

The network 110 may include substantially any type of communication mechanisms, such as, but not limited to, local area networks, wide area networks, and the like. The network 110 may include wireless and/or wireless communication methods. The displays, computing devices, and the like, may be employed as single devices and/or multiple devices cooperating in a distributed environment.

With reference to FIG. 2, an example display environment 104 is disclosed from the point of view of the supplemental display 106. The supplemental display 106 may view the display environment 104, which may include a room or other area, including a wall 116 or surface, one or more pieces of furniture 130 (e.g., bookcase, fireplace, lamps, sofas, chairs, etc.), lighting and color characteristics, and one or more wall 116 mounted elements 108 (e.g., pictures, frames, artwork or other decorative objects, shelves, lamps, etc.). The display environment 104 also includes the primary display 102 and optionally one or more input devices (e.g., remote controls, user devices, etc.). In various embodiments, the supplemental display 106 is configured to detect characteristics, such as layout, colors, obstructions, furniture, user movement, input devices, and the like, within the display environment 104 to determine supplemental display locations, such as "empty" (e.g., empty areas not including wall mounted elements 108 or surface variations of a surface or wall 116) or available display locations near or adjacent to the primary display 102. As can be appreciated, the display environment 104 will vary based on different user environments and the like, e.g., different rooms of a person's house, different houses, different locations and the like. The display environment 104 may also vary between two different times of observation, such as if a user rearranges the furniture 130 or wall mounted elements 108 within the same room.

Figure 3:
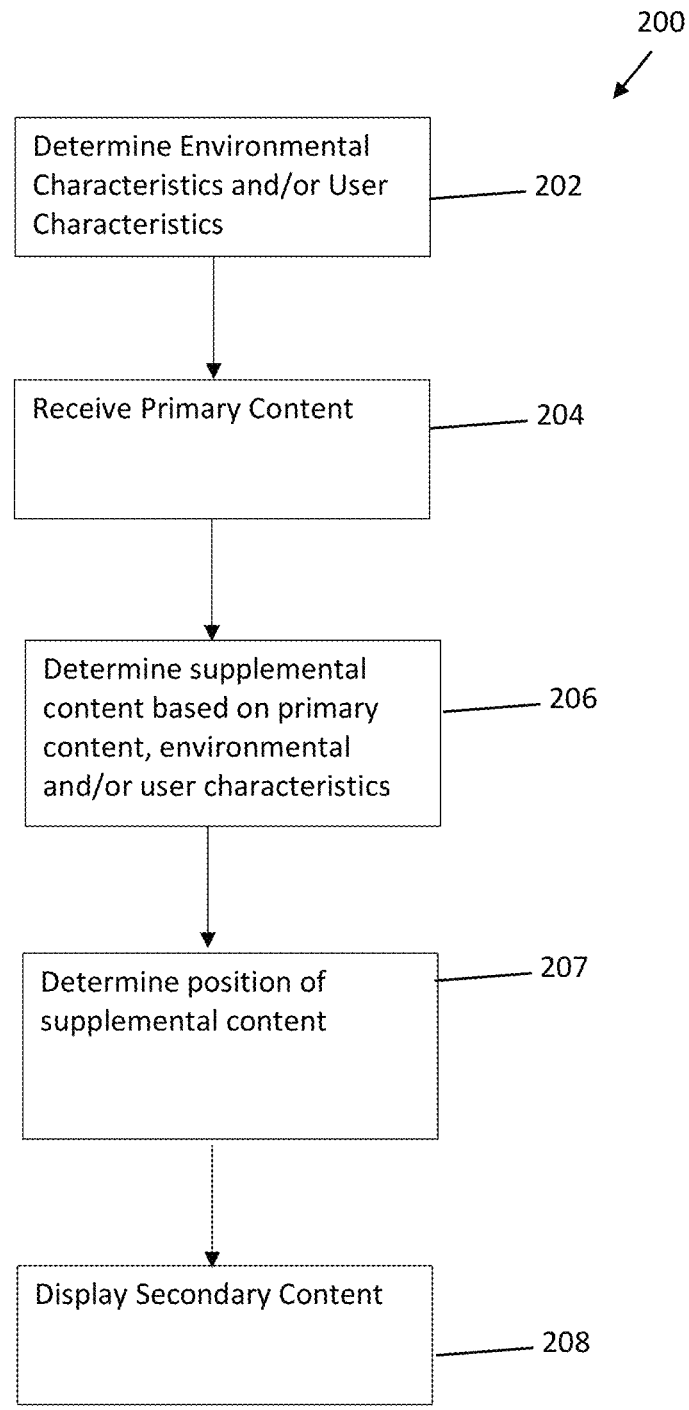
FIG. 3 is a flow chart for a method of utilizing the system to display supplemental content.

FIG. 3 illustrates a flow chart of a method 200 for using the system 100 to generate and display supplemental content. The method 200 includes operation 202 in which environmental characteristics and/or user characteristics are determined. For example, the supplemental display 106 may analyze the display environment 104 using one or more of the sensors 118 in order to determine environmental characteristics, such as, but not limited to, location and size of the primary display 102, location and size of furniture 130 or other room obstructions, location and size of wall 116 mounted elements 108, as well as depth information related to the display environment 104, furniture 130, and/or wall mounted elements 108. Other environmental characteristics may include wall 116 colors, lighting sources, lighting locations, geometry of the room (e.g., overall shape, corners, sloped surfaces, etc.), and so on. The environmental characteristics may be used to determine supplemental display locations, such as empty surfaces, where supplemental content may be displayed. Alternatively, the supplemental display 106 may directly detect supplemental content display locations, such as identifying areas on a surface free from furniture 130 and wall mounted elements 108 and are within a desired area or distance of the primary display 102.

As a specific example, the supplemental display 106 may display light patterns (e.g., structured light) via the light source 126 in the display environment 104 and capture the reflections of the light patterns from various elements within the display environment 104. Differences between the displayed light patterns and the captured light patterns can be used to determine supplemental display locations, depth information, and/or environmental characteristics. For example, changes in the dimensions of the displayed pattern can indicate that there may be a raised element, such as a mounted wall element, on the wall in a particular area. As another example, changes in the color of the displayed pattern as compared to the pattern displayed in other locations may indicate that there is a variation of color in that area of the display environment 104.

Additionally or alternatively, operation 202 may include determining or receiving user characteristics. The user characteristics may include user preferences related to the supplemental content or primary content and/or the display locations of the supplemental content. For example, certain users may desire to have certain types of supplemental content displayed and not others, e.g., sports scores vs. stock information, movie trivia vs. plot information, etc. Similarly, certain users may desire certain supplemental display locations over others, e.g., directly adjacent to the right or left of the primary display 102 vs. below or above the primary display 102. The user characteristics may be input to the system 100, e.g., via the input/output interface 120 on the supplemental display 106, input via a user device, and/or may be determined by the system 100 (e.g., tracking user behavior over a period of time, detecting user inputs via the system, based on secondary user information, or the like).

As one example, the system 100 via the sensors 118 may detect a user display preference by detecting a user gesture. Continuing with this example, a user may point to an area of the display environment 104 where the user would prefer the supplemental content to be displayed. The system 100 may generate and analyze a directional vector extending from the user's hand, identify an intercepting wall, and identify that wall as the desired area for display of the supplemental content. As another example, the system 100 may utilize the sensors 118 to detect a gaze direction of the user. From there, the system can utilize a direction vector to determine a location within the display environment 104 that the user has identified (e.g., is looking towards) and use that identification as user input for display preference. As a specific example, the user could swipe his or her arm in a particular direction and the sensors 118 could capture images of the motion, analyze the change in position, and determine that the user is motioning from left to right (or other direction) and use such input to adjust the display location from left to right or the like.

In some instances, the system 100 may be able to detect multiple users and distinguish inputs from the two users, such as by detecting different user characteristics (e.g., clothing colors, height, voice or the like). Additionally, in some instances, different users may be able to control a different display area of the supplemental content. For example, the system 100 may be configured to support multiple changes in supplemental content, such as a first change instructed by a first user and a second change instructed by a second user. In instances where multiple users may identify a similar display area at the same time, the system 100 may default to a one of the users, e.g., a primary user, strongest vector, most head-on pointing vector), to determine the overriding or controlling command. As another option, the system 100 may select a user at random for the controlling command.

It should be noted that operation 202 may be dynamic and update periodically or as characteristics vary. In this manner, the system may be able to adapt the placement of supplemental content based on changes in layout of the viewing environment (e.g., moved furniture, changes in color, etc.). For example, the system 100 may run a calibration at startup that confirms the display environment 104 or aspects of the display environment 104 relevant to display of the supplemental content are the same as the last use. As another example, the system 100 may evaluate the display environment 104 after a predetermined time period or randomly to determine if there are changes to be taken into account.

The method 200 may also include operation 204 and primary content may be received. The primary content may be transmitted to the primary display 102, e.g., from the content sources 112 or servers 114. Optionally, the primary content may also be received by the supplemental display 106 or data corresponding to the primary content may be received or detected by the supplemental display 106. The primary display 102 displays the primary content within the display environment 104, e.g., by forming images on the primary display 102 itself. In one example, the primary display 102 is a television and the primary content is displayed on a screen of the television. The primary content may be a show, movie, series, news broadcast, sporting event, or the like. As illustrated in FIG. 3, operation 202 is performed before operation 204. In some examples, operation 202 and operation 204 may be performed concurrently (e.g., in parallel). In other examples, operation 204 may be performed before operation 202.

The method 200 may include operation 206 and supplemental content is determined. The supplemental content may be determined by the servers 114, content sources, or other databases, primary display 102, and/or supplemental display 106. In many embodiments, the supplemental content is determined based on or corresponding to the primary content. In this manner, the supplemental content may enhance the primary content or include additional information related to the primary content that enhances the user's experience. The supplemental content may be determined based on a data store related to the primary content, where options for supplemental content may be selected based on the environmental characteristics or user preferences, e.g., for a particular movie the system 100 can select movie trivia, actor information, plot guides, or summaries. In some embodiments, the information may be retrieved from third-party databases, such as third parties that are not associated with the generation of content. In yet other embodiments, the information may be retrieved from databases related to the content providers.

The system 100 may also select a particular supplemental content based on the supplemental display locations (e.g., if there is sufficient space to display the particular type of supplemental content) and/or user preferences for certain types of supplemental content. For example, the supplemental content data store may include three supplemental content options and given the display location, the system 100 may select the supplemental content to fit within the display location. As another example, the system 100 may select a supplemental content for display based on a user preference for a content type, e.g., a user may have indicated a user preference for trivia to be displayed.

In some embodiments, multiple types of supplemental content may be selected, such as, close captioning and plot information, where the types of supplemental content may be a reformatting of a portion of the primary content (e.g., close captioning), as well other content that corresponds to but is different from the primary content (e.g., summary plot information, actor trivia, etc.). These supplemental content items may be displayed together or separately from one another (e.g., at different frames within the primary content). The supplemental content may be prepared by the content creators, such as a "bonus feature" for purchasing a content item or otherwise configured to sync with the primary content as an enhanced experience. As an example, the content creators may add supplemental content that provides a more immersive and individualized experience for the user, e.g., rain images to be displayed on a window area of the display environment 104 during a raining scene in a movie.

The supplemental content may be determined using algorithms, such as machine learning or artificial intelligence techniques, that can use information derived from the primary content to search databases, such as servers 114, for additional or related information. For example, the system 100 may analyze audio or language content, such as via a natural language processor, to extract key terms or important terms for the primary content and then search the Internet or specific databases for the key terms to generate supplemental content for display. As another example, the system 100 may utilize a machine learning classifier to analyze image frames in the content to extract information that is then used to identify or generate supplemental content for display, e.g., images can be analyzed to determine actor or character identities and such information is then used to retrieve trivia or facts regarding the actors or characters.

In some embodiments, the supplemental content to be displayed may also include metadata or other information that may be used to select the display location. In these instances, the supplemental content metadata may be used to override a display location, adjust the display location, or cause another instance (e.g. duplicate) of the supplemental content display for the display environment 104. For example, in instances where the supplemental content is generated by the primary content creator, the content creator may dictate where the supplemental content should be displayed and this information could be used to adjust the display location within the display environment 104. As a specific example, for a horror movie, the supplemental content may be images representing shadows and the metadata may dictate that the shadows are to be displayed on a wall with a window or door to make it more realistic.

In some embodiments, the system 100 may further format the supplemental content for display, such as reducing the size, enhancing contrast, or the like, in order to format the supplemental content to match the supplemental display location and appearance of the display environment 104, such as a lighting level or a color of the surfaces. For example, the supplemental content may be selected to be displayed in a first color, but the base display for the color may interact with a wall color in the display environment 104 that would cause the supplemental content to appear differently to the user. In this example, the supplemental content may be formatted to update the displayed color to account for the wall color to ensure the user experience matches the desired output of the supplemental content. As another example, the supplemental content may need to be reduced in size to ensure that the supplemental content will fit in the display location.

In other examples, the supplemental content may be used to "extend" the primary display 102, allowing content to be presented with the primary content but on a larger area to avoid obscuring or crowding of the primary content on the primary display 102. In this manner, the supplemental content may be used to assist with vision issues (e.g., increase text size, contrast, or variation in colors for color blind users).

In various embodiments, the supplemental content may be timed with or synced to the primary content such that images displayed by the supplemental display 106 are displayed with images of the primary content. For example, the supplemental content may be timecoded to the primary content, e.g., a time code may be identified or transmitted with the primary content (which may be stored as metadata with the primary content) that allows the supplemental content to be projected at a desired time relative to display of the primary content.

With reference to FIG. 3, the method 300 may include operation 207 and the position of the supplemental content within the display environment 104 may be determined. In some instances, this operation may be combined with operation 206 and/or performed before operation 206 (e.g., the position of the supplemental content may be determined and used to determine the supplemental content). The positioning of the supplemental content may be determined by the supplemental display 106, which may use one or more sensors 118 to identify display locations within the display environment 104. Alternatively or additionally other sensors or devices (e.g., user input devices) may be used to determine or provide data that can be used to determine the position of the supplemental content within the display environment 104.

For example, a user device, such as a remote, smart phone, or the like, can be used to identify a display location. As one implementation, the user device may include a light projector which projects a light onto a location of the display environment 104, which can then be analyzed (e.g., via an image) to determine a display location. As another example, the user may point or look at a particular area of the display environment 104 and the system 100 can analyze directional information from the user input to identify a display location. As yet another example, the user may provide input via voice commands, e.g., display on the north facing wall or display on the right side of the primary display 102, and the system 100 can utilizing this input to identify and select a display location for the supplemental content.

With reference to FIG. 3, the method 200 may further include operation 208 and the supplemental content is displayed. For example, the supplemental display 106 may activate the light source 126 to emit light forming the supplemental content. In one embodiment, the supplemental display 106 may display the light from the light source 126 onto the supplemental content locations, e.g., wall space, on the primary display 102, or the like. In these embodiments, the supplemental display 106 may be formed as a projector to project the light onto different surfaces. In other embodiments, the supplemental display may be a television or the like and the supplemental content may be formed on the display itself. In these embodiments, the supplemental display 106 may include display elements (e.g., liquid crystal pixels, light emitting diodes, organic light emitting diodes, etc.) positioned around the display environment 104. In various implementations, the supplemental content may be synchronized, linked, or otherwise correspond to the primary content, such that content in both the supplemental and primary content may represent information at specific frames that correspond to each other.

Using the method 200, the system 100 may generate and display supplemental content onto various surfaces, including the primary display 102, within the display environment 104. This supplemental content may enhance the viewing experience by the user, as well as provide additional information regarding the primary content.

FIGS. 4A-8B illustrate various examples of supplemental content being displayed based on the primary content and at different supplemental display locations based on the user preferences and display environment 104.

Figure 4A:
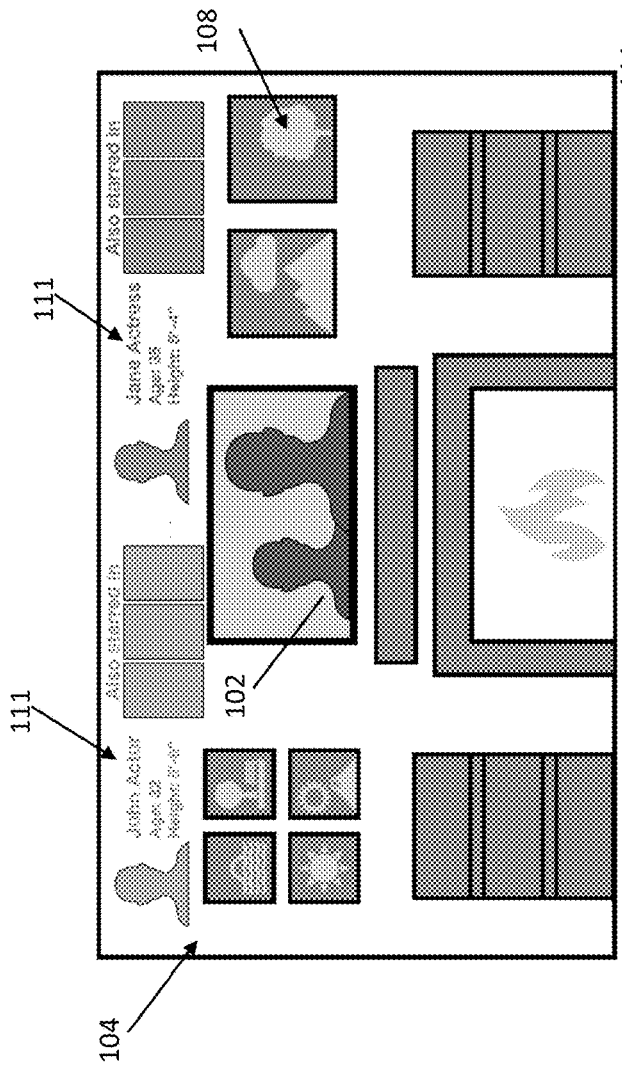
FIG. 4A is an example of a first type of supplemental content in a first configuration.
Figure 4B:
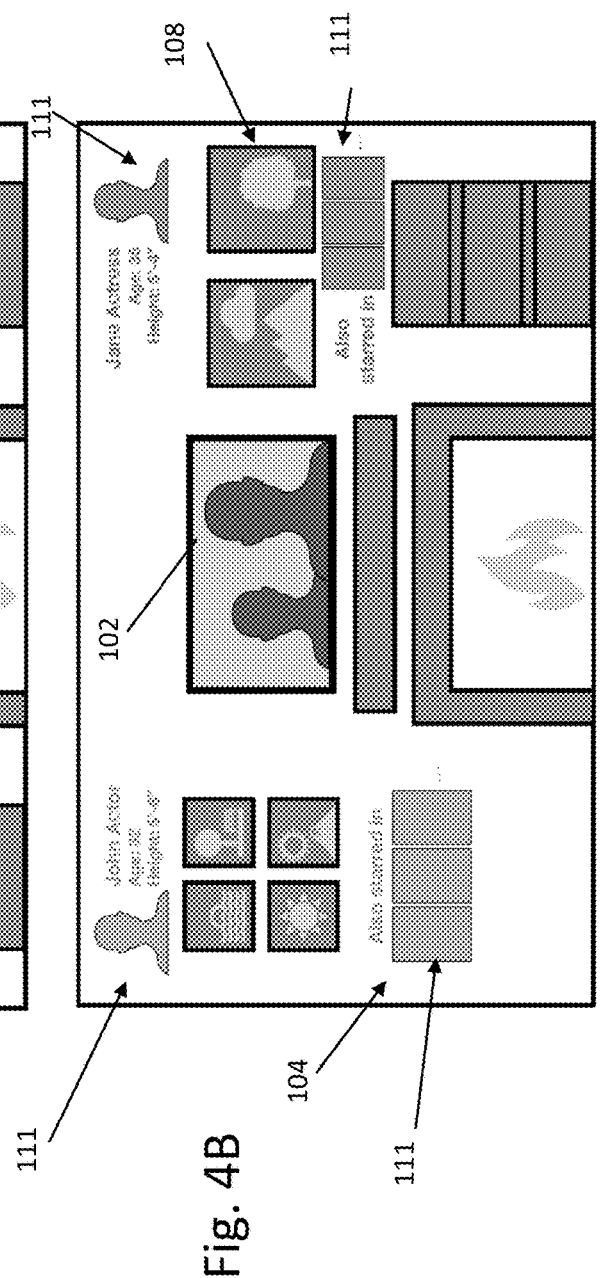
FIG. 4B is an example of the first type of supplemental content in a second configuration.

FIGS. 4A and 4B illustrate secondary content information as the supplemental content 111, with the supplemental content 111 display locations being varied between the first display environment 104 shown in FIG. 4A and the second display environment shown in FIG. 4B. For example, the supplemental content 111 includes actor information and other content that the actors have appeared in. In this example, the supplemental content 111 may be pulled from the servers 114, which may be third party servers, e.g., from movie and actor databases (e.g., IMDb at www.imdb.com or other sources accessible via the internet, live social media feeds, WIKIPEDIA®, etc.), where the primary content information displayed on the primary display 102, such as title, year, and the like, is used to retrieve the secondary content information, either directly from a content provider (i.e., not third party sources or servers) or from other sources.

Figure 5A:
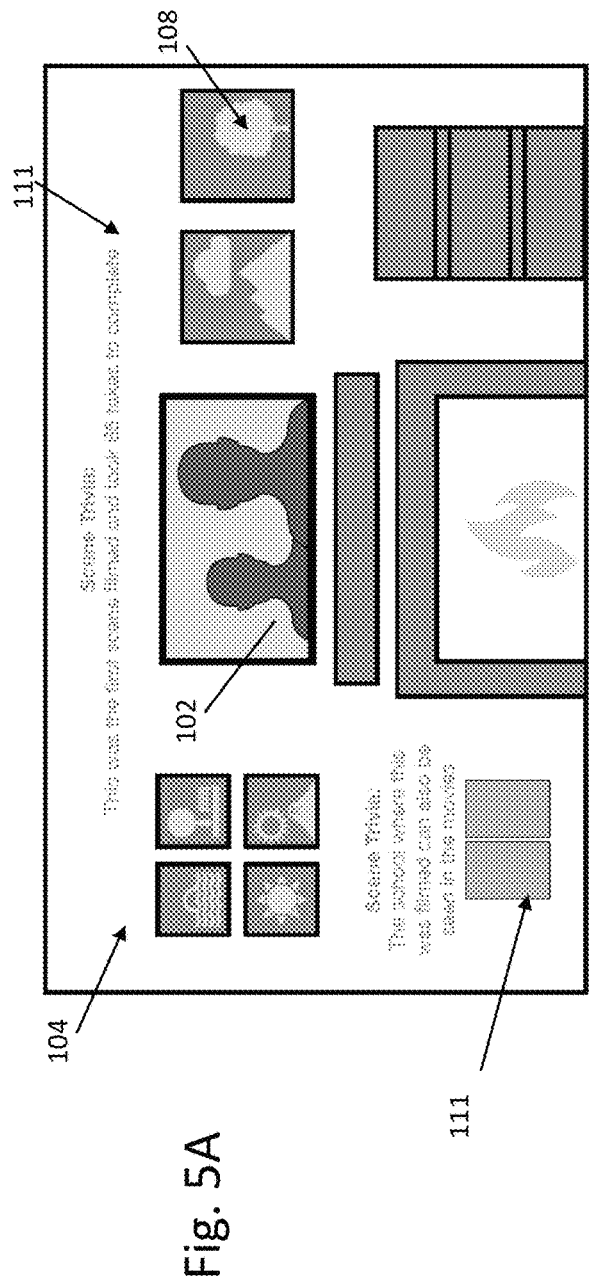
FIG. 5A is an example of a second type of supplemental content in a first configuration.
Figure 5B:
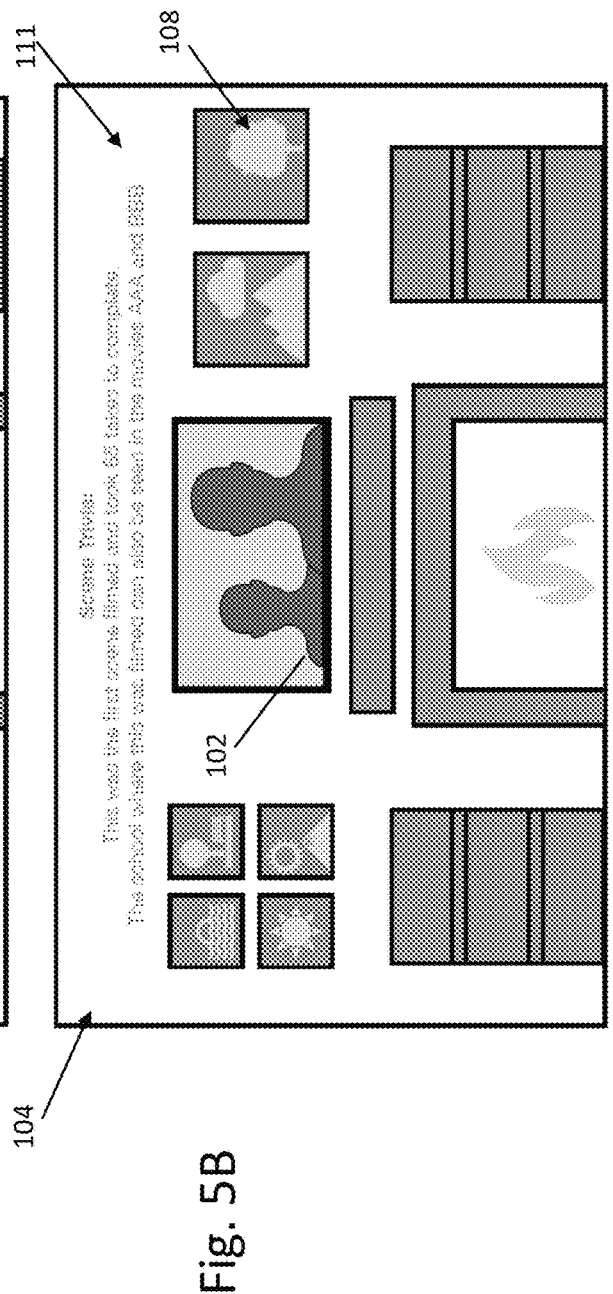
FIG. 5B is an example of the second type of supplemental content in a second configuration.

FIGS. 5A and 5B illustrate an example of content trivia as the supplemental content 111. As with FIGS. 4A and 4B, this supplemental content 111 may be retrieved or accessed as part of the primary content on the primary display 102 and/or may be accessed separately from the primary content. As shown in FIG. 5A, the supplemental content 111 is displayed in two locations based on the display environment 104 characteristics, whereas in FIG. 5B, the supplemental content 111 is formatted to fit in a single display location or area.

Figure 6A:
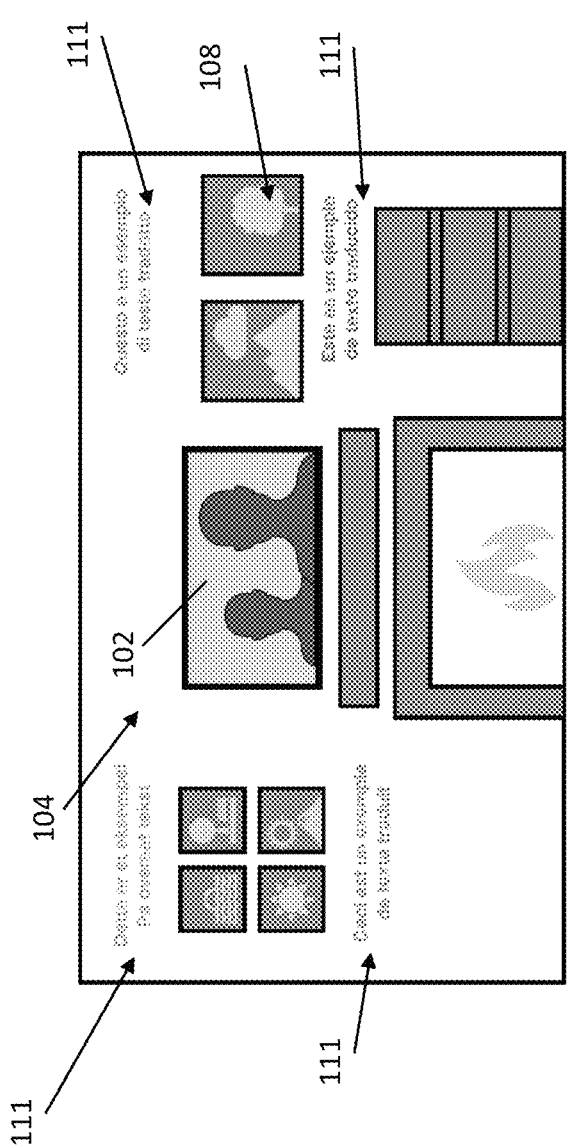
FIG. 6A is an example of a third type of supplemental content in a first configuration.
Figure 6B:
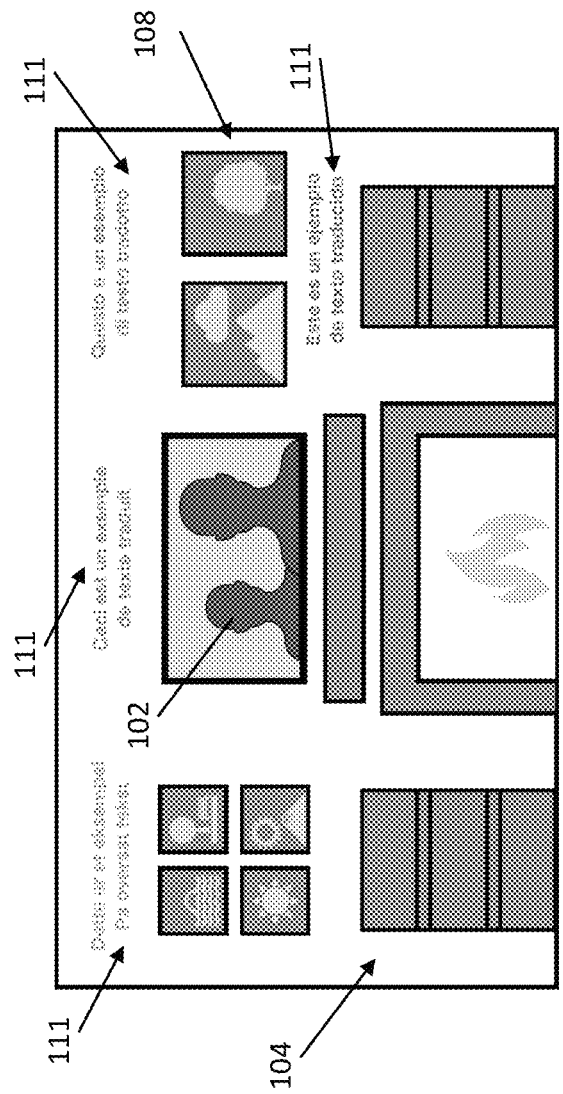
FIG. 6B is an example of the third type of supplemental content in a second configuration.

FIGS. 6A and 6B illustrate language content as the supplemental content 111. In this example, the supplemental content 111 may be translations of the primary content displayed on the primary display 102 into one or more languages (including or excluding the language of the audio of the primary content), e.g., translation of audio or visual aspects. Also, as shown one or more translations may be displayed simultaneously (in the same or different languages), but at different supplemental display 111 locations within the display environment 104.

Figure 7A:
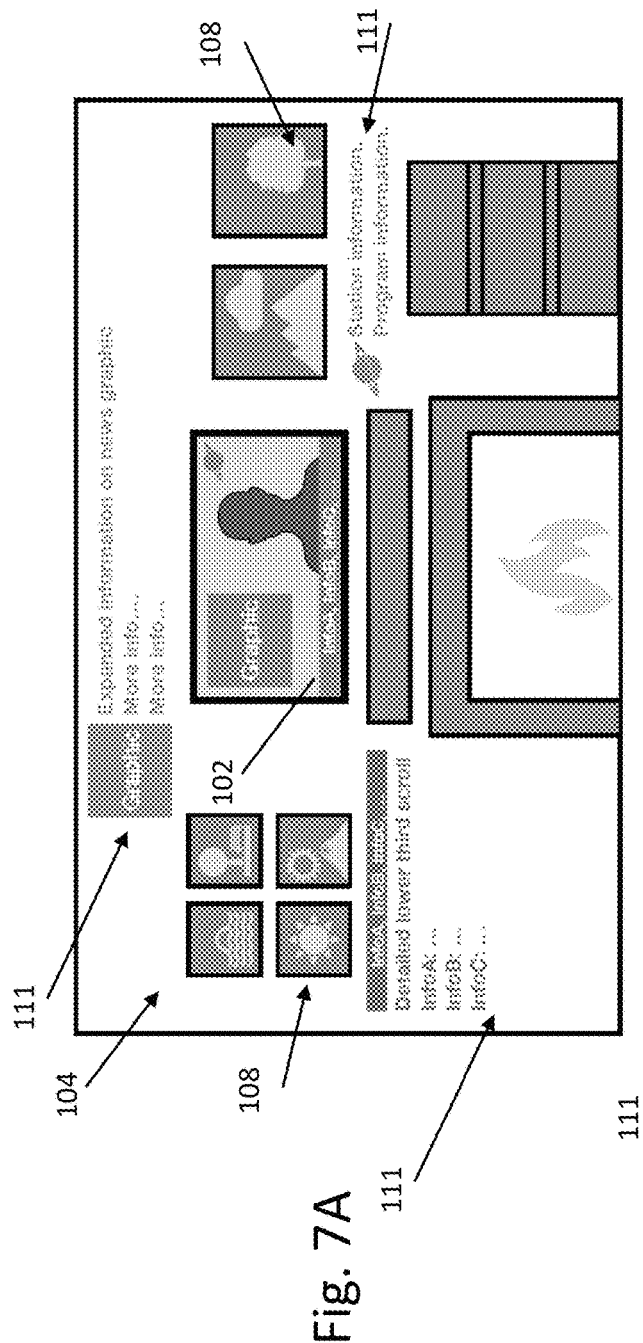
FIG. 7A is an example of a fourth type of supplemental content in a first configuration.
Figure 7B:
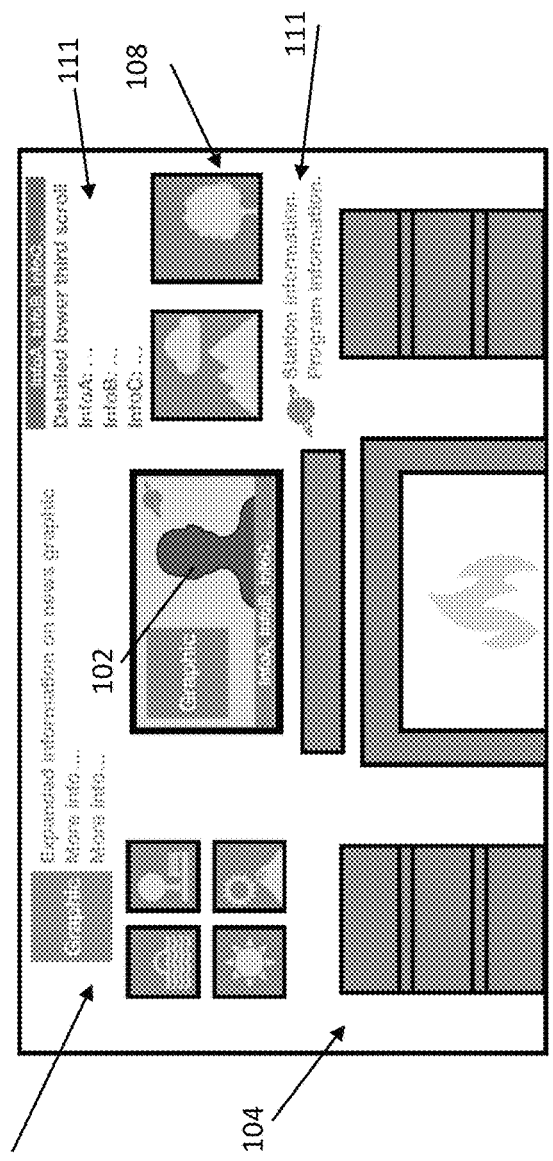
FIG. 7B is an example of the fourth type of supplemental content in a second configuration.

FIGS. 7A and 7B illustrate additional content information as the supplemental content 111. This information may include news, stocks, weather, sports scores, and the like. This information may be based on the primary content displayed on the primary display 102 or may be separate or different from the primary content (e.g., based solely on user preferences). In the latter example, a user may wish to view current sporting scores while watching primary content (e.g., a movie) that is unrelated to the supplemental content 111. As shown in FIGS. 7A and 7B, the supplemental content 111 is displayed at different locations dependent on the display environment 104.

Figure 8A:
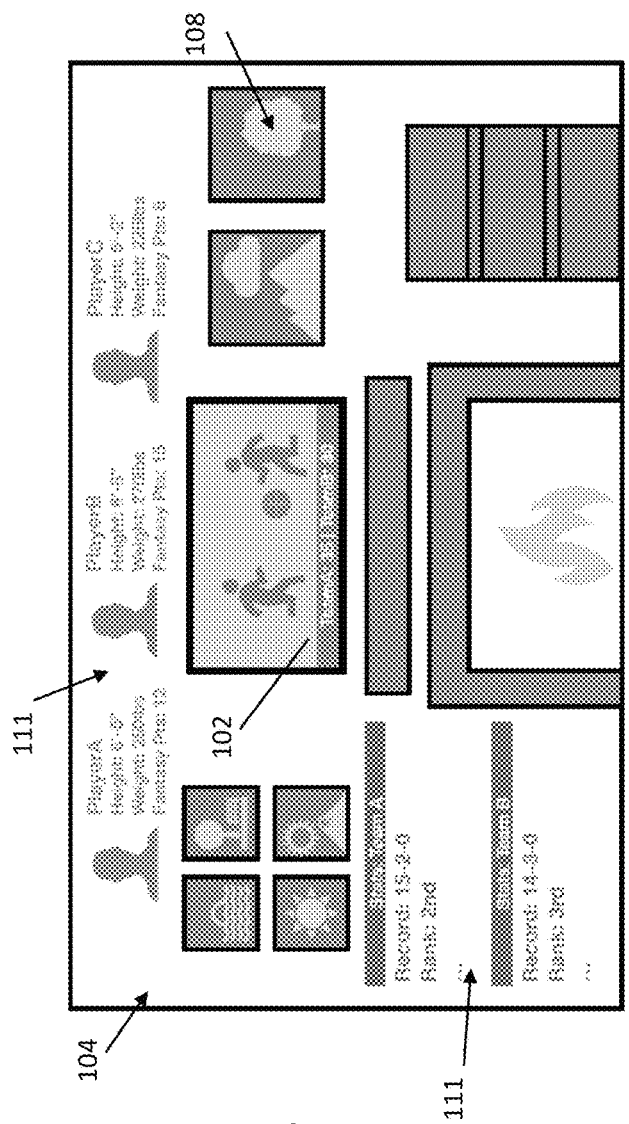
FIG. 8A is an example of a fifth type of supplemental content in a first configuration.
Figure 8B:
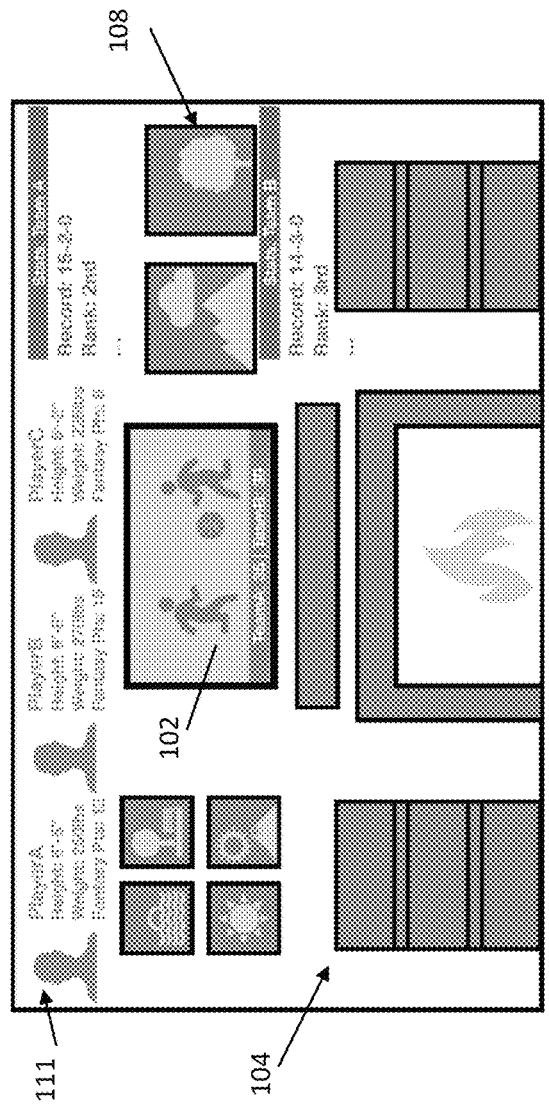
FIG. 8B is an example of the fifth type of supplemental content in a second configuration.

FIGS. 8A and 8B illustrate sports information as the supplemental content 111. In this example the primary content displayed on the primary display 102 may be a sporting event (e.g., basketball game, football game, soccer game, baseball game, etc.) and the supplemental content 111 may be information related to the teams, players, or leagues. As with the other examples, the supplemental content 111 is formatted and positioned based on the characteristics of the particular display environment 104.

It should be noted that in various embodiments, the system 100 is described as analyzing features of the display environment 104 for controlling the location of the supplemental content. However, the system 100 may also be able to use analysis of the display environment 104 characteristics to provide inputs to the system, such as to change the location of the supplemental display, change the supplemental content, or the like. Additionally, the system 100 may also analyze the display environment 104 as inputs to the system 100. For example, the sensor(s) 118 may track motion during display, such as due to a child or dog entering into the display environment 104, and may use such input to vary the display of the supplemental or primary content, e.g., can pause the primary content based on the motion. The system 100 may also be tied to databases or the Internet so as to be able to generate on-demand content, similar to a home assistant, where the output of the on-demand content may be presented in location dictated by a user input. For example, a user may ask the system 100 for information (e.g., current temperature), and the system 100 can determine a user gaze direction and display the supplemental content (e.g., temperature) on the wall where the user is looking.

Also, while the discussion of supplemental content has been discussed with respect to visual content, it should be appreciated that the supplemental content may include other types of content, such as audible content. Where the output of the supplemental content is determined based on the environmental characteristics of the display environment 104 as detected by the system. For example, the system 100 may determine that the display environment 104 includes a window on the south facing wall and the supplemental content may include "rain sounds" that may be configured to be output by speakers on the south wall due to the identification of the window by the system 100.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features were not discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A method of displaying supplemental content comprising:
    detecting, using a sensor, one or more environmental characteristics for a display environment, the one or more environmental characteristics including a presence of one or more obstacles in the display environment;
    determining supplemental content based in part on a primary content displayed by a primary display;
    identifying, based on the one or more environmental characteristics and a user input or a user preference, a position in the display environment for display of the supplemental content, wherein the position is different from a position of the primary display, wherein the position for display of the supplemental content is free from the one or more obstacles detected by the sensor; and
    displaying the supplemental content in the display environment.

2. The method of claim 1, wherein displaying the supplemental content comprises projecting light onto an area of the display environment.

3. The method of claim 1, wherein the supplemental content presents information different from information presented in the primary content.

4. The method of claim 1, wherein the sensor is an infrared light sensor.

5. The method of claim 1, wherein displaying the supplemental content comprises projecting the supplemental content by a supplemental display.

6. The method of claim 1, wherein the supplemental content is determined by accessing one or more databases based on information from the primary content.

7. The method of claim 1, wherein the supplemental content is formatted based on the one or more environmental characteristics.

8. The method of claim 1, further comprising updating the supplemental content based on detecting a user action within the display environment.

9. The method of claim 1, wherein the user input is a detected user action, wherein the detected user action includes at least one of a gesture, a gaze, or a voice instruction.

10. The method of claim 1, wherein the primary display is an alternative reality or virtual reality display in the display environment.

11. A system for displaying supplemental content comprising:
    a primary display configured to display primary content; and
    a supplemental display configured to display supplemental content different from the primary content, wherein the supplemental display is configured to:
        determine a display location for the supplemental content based on a user input or a user preference and an analysis of one or more environmental characteristics detected by a sensor of a display environment of the primary content, wherein the display location of the supplemental content is different from a position of the primary display, wherein the one or more environmental characteristics include a presence of one or more obstacles in the display environment, wherein the display location for the supplemental content is free from the one or more obstacles detected by the sensor;
        select the supplemental content based in part on the display location and the primary content; and
        display the supplemental content at the display location.

12. The system of claim 11, wherein the supplemental content corresponds to the primary content and presents information different from information relayed in the primary content.

13. The system of claim 11, wherein the supplemental display is further configured to determine the display location by detecting, using the sensor, an empty space on a wall within the display environment.

14. The system of claim 11, wherein the supplemental display is configured to select the supplemental content by analyzing the primary content and searching third party databases for related content to the primary content.

15. The system of claim 14, wherein the supplemental content comprises one or more of a trivia about the primary content or an actor or character therein, a plot summary of the primary content, or an Internet search result based on the primary content.

16. The system of claim 11, wherein the supplemental display is further configured to:
    utilize an additional user input to update the display location of the supplemental content.

17. A non-tangible computer readable medium storing instructions that when read by a computer cause the computer to:
    determine a display location for supplemental content to be displayed by a supplemental display based on a user input or a user preference and an analysis of one or more environmental characteristics detected by a sensor of a display environment for primary content displayed by a primary display, wherein the display location for the supplemental content is different from a position of the primary display, wherein the one or more environmental characteristics include a presence of one or more obstacles in the display environment, wherein the display location for the supplemental content is free from the one or more obstacles detected by the sensor;
    select the supplemental content based in part on the display location and the primary content; and
    display the supplemental content at the display location.

18. The non-tangible computer readable medium of claim 17, further comprising instructions to cause the computer to format the supplemental content based on at least one of a user preference, a user action, or the one or more environmental characteristics.

19. The non-tangible computer readable medium of claim 17, wherein the one or more environmental characteristics comprise a color of the surface of the display environment.

* * * * *